(12) United States Patent
Ohba

(10) Patent No.: US 7,144,082 B2
(45) Date of Patent: Dec. 5, 2006

(54) SEAT RECLINING APPARATUS FOR AUTOMOTIVE VEHICLE

(75) Inventor: Tetsuya Ohba, Shizuoka (JP)

(73) Assignee: Fuji Kiko Co., Ltd., Kosai (JP)

( * ) Notice: Subject to any disclaimer, the term of this patent is extended or adjusted under 35 U.S.C. 154(b) by 0 days.

(21) Appl. No.: 11/369,941

(22) Filed: Mar. 8, 2006

(65) Prior Publication Data
US 2006/0202539 A1   Sep. 14, 2006

(30) Foreign Application Priority Data
Mar. 9, 2005  (JP) .............................. 2005-064746

(51) Int. Cl.
*B60N 2/235* (2006.01)
(52) U.S. Cl. ...................................... 297/367
(58) Field of Classification Search .................. 297/367
See application file for complete search history.

(56) References Cited

U.S. PATENT DOCUMENTS

| | | | |
|---|---|---|---|
| 4,143,905 A * | 3/1979 | Hensel et al. .......... | 297/362.12 |
| 5,590,931 A * | 1/1997 | Fourrey et al. ............. | 297/367 |
| 6,085,386 A * | 7/2000 | Blanchard et al. .......... | 297/367 |
| 6,312,053 B1 * | 11/2001 | Magyar ...................... | 297/367 |
| 6,648,414 B1 * | 11/2003 | Ikegaya et al. ............. | 297/367 |
| 6,666,515 B1 * | 12/2003 | Asano et al. ................ | 297/366 |
| 6,854,802 B1 * | 2/2005 | Matsuura et al. ........... | 297/367 |
| 6,908,156 B1 * | 6/2005 | Park et al. ................... | 297/367 |

FOREIGN PATENT DOCUMENTS

EP    1 225 086 A1    7/2002
JP    2002-345587 A   12/2002

OTHER PUBLICATIONS

U.S. Appl. No. 11/369,838, filed Mar. 8, 2006, Ohba.

* cited by examiner

*Primary Examiner*—Peter R. Brown
(74) *Attorney, Agent, or Firm*—Foley & Lardner LLP

(57) ABSTRACT

A seat reclining apparatus for a vehicle including a base member and a rotational member having an internal gear. A lock tooth is provided having an external gear engageable with the internal gear. A shaft section is provided is provided having an outer peripheral side guide surface. A cam is provided for having an inner peripheral side guide surface. Each of a pair of guide sections biasing the lock tooth to engage the external gear with the internal gear. The lock tooth has an outer peripheral side slide surface and a contact face. One of the guide sections has a backup surface. The one of the guide sections has a step portion formed between the outer peripheral side guide surface and the backup surface. Further, the lock tooth has a protruding section contactable with the step portion.

3 Claims, 4 Drawing Sheets

SEAT RECLINING APPARATUS FOR AUTOMOTIVE VEHICLE

BACKGROUND OF THE INVENTION

This invention relates to improvements in a seat reclining apparatus for a vehicle which apparatus is arranged to angularly adjustably fix a seat back serving as a backrest to a seat cushion on which a vehicle occupant is seated so as to be sustainable even when an excessive load is applied to the seat back.

A seat reclining apparatus for a vehicle is provided to a vehicle seat to angularly adjustably fix a seat back to a seat cushion, by which a position of the seat back can be angularly adjusted with respect to the seat cushion. A conventional seat reclining apparatus includes, for example, a frame installed to a base plate on the side of the seat cushion, and a lid member installed to an arm plate on the side of the seat back. The frame and the lid member are arranged rotatable to each other. An external gear of a lock tooth installed to the frame is engaged with an internal gear formed at the inner peripheral surface of the lid member so as to restrict the relative rotation between the frame and the lid member, thereby keeping the seat back at a certain angle position to the seat cushion.

In order to fix the lock tooth, the frame is projectingly provided with a projecting shaft section and a projecting guide section located in the vicinity of the internal gear. The lock tooth is formed with a depression-shaped bearing surface to be swingably engaged with the shaft section, and a slide surface coaxial with the bearing surface and slidably contacted with a guide surface of the guide section. Additionally, a cam is disposed at the central part of a space defined by the internal gear in order to bias the lock tooth outwardly so as to engage the external gear with the internal gear.

With the above-arranged seat reclining apparatus, when collision occurred at a rear section of an automotive vehicle, a load is applied in such a direction that the seat back falls rearward and acts on the lock tooth through meshing between the internal gear and the external gear. At this time, the lock tooth is supported by the shaft section and the guide section thereby restricting rotation of the lid member relative to the frame, so that the seat back never rotationally falls or inclines rearward.

Further, in conventional techniques, a seatbelt anchor for supporting a force applied to a seatbelt is a center pillar; however, in recent years, vehicles in which the seatbelt anchor is changed from the center pillar to the seat back are increasing. When collision occurs at a front section of such a vehicle, an inertial force due to the vehicle occupant's weight is applied to the seat back in a direction to fall forward, so that the seat back receive a higher load than that in the conventional techniques. Therefore, it is required for the seat reclining apparatus for the vehicle to sustain a significantly high load as compared with that in the conventional techniques.

A seat reclining apparatus to meet the above requirement is disclosed in Japanese Patent Provisional Publication No. 2002-345587, in which the guide section is arranged to be lower than the shaft section in strength in order to decrease occurrence of a bending stress which acts to bend the lock tooth at a portion in the vicinity of a bearing portion. This is intended to prevent breakage of the lock tooth so as to stabilize the strength. In this structure, a clearance is formed between a contact face of the lock tooth and a backup surface of the guide section, so that the contact face cannot be brought into contact with the backup surface when a load is applied in such a direction that the seat back falls forward. As the contact face is not brought into contact with the backup surface, a reactive force from the backup surface never acts on the lock tooth, and therefore the lock tooth does not receive the bending stress thereby being prevented from its breakage.

SUMMARY OF THE INVENTION

However, drawbacks have been encountered in the above conventional seat reclining apparatus. More specifically, there is a limit for receiving a load in a case where a further high load is applied to the seat back, so that it is necessary to increase a load applied to the guide section. However, when the load applied to the guide section increases, there rises a fear that the bending stress acts on the bearing portion of the lock tooth so as to break the lock tooth at an early stage. When the lock tooth is broken, the lock tooth becomes to be supported only by the shaft section and the cam, so that the meshing between the external gear and the internal gear is degraded. That is, the seat reclining apparatus cannot be improved and stabilized in strength.

In view of the above, an object of the present invention is to provide an improved seat reclining apparatus for a vehicle which apparatus can effectively overcome drawbacks encountered in conventional seat reclining apparatus.

An aspect of the present invention resides in a seat reclining apparatus for a vehicle which seat reclining apparatus comprises a base member connected to one of a seat cushion and a seat back rotatably fixed to the seat cushion. A rotational member is provided to have an internal gear formed at an inner peripheral surface of the rotational member. The rotational member is connected to the other of the seat cushion and the seat back and rotatable relative to the base member in a peripheral direction of the rotational member. A lock tooth is provided to have an external gear which is engageable with the internal gear, and is swingable in directions in which the external gear is engaged with and disengaged from the internal gear. A shaft section is provided to have an inner peripheral side guide surface for swinging the lock tooth along an arcuate orbit and is formed integral with the base member. A pair of guide sections is provided such that each of the guide sections has an outer peripheral side guide surface for swinging the lock tooth along the arcuate orbit and is formed integral with the base member and located in vicinity of opposite ends of the arcuate orbit. A cam is disposed for biasing the lock tooth to engage the external gear with the internal gear. In the seat reclining apparatus, the lock tooth has an outer peripheral side slide surface formed facing one of the guide sections located on the side of the shaft section with respect to the external gear and slidably contacted with the outer peripheral side guide surface of the one of the guide sections. The one of the guide sections has a backup surface for receiving a load from the lock tooth when the load is high. The lock tooth has a contact face facing the backup surface through a clearance. As a result, a rotational load for rotating the rotational member relative to the base member is received by the shaft section and the one of the guide sections when the rotational load acts. Additionally, the one of the guide sections has a step portion formed between the outer peripheral side guide surface and the backup surface. The lock tooth includes a protruding section which faces the step portion and is located between the outer peripheral side slide surface and the contact face. As a result, a reactive force which the protruding section receives from the step portion when the protruding section is brought into contact with the step portion is directed onto the side of the cam with respect to a tangential plane to a bearing surface of the lock tooth which is slidably contacted with the inner peripheral side guide surface of the shaft section. The tangential plane passes the step portion.

According to the present invention, when the lock tooth is displaced toward one of guide sections, a protruding section of the lock tooth is brought into contact with a step portion of the one of the guide sections so as to receive a load. At this time, a reactive force which the protruding section receives from the step portion is directed to the side of the cam with respect to a tangential plane to the bearing surface of the lock tooth, the tangential plane passing the step portion, so that the lock tooth cannot receive the bending stress so as to be prevented from its breakage.

DETAILED DESCRIPTION OF THE INVENTION

Figure 1A:
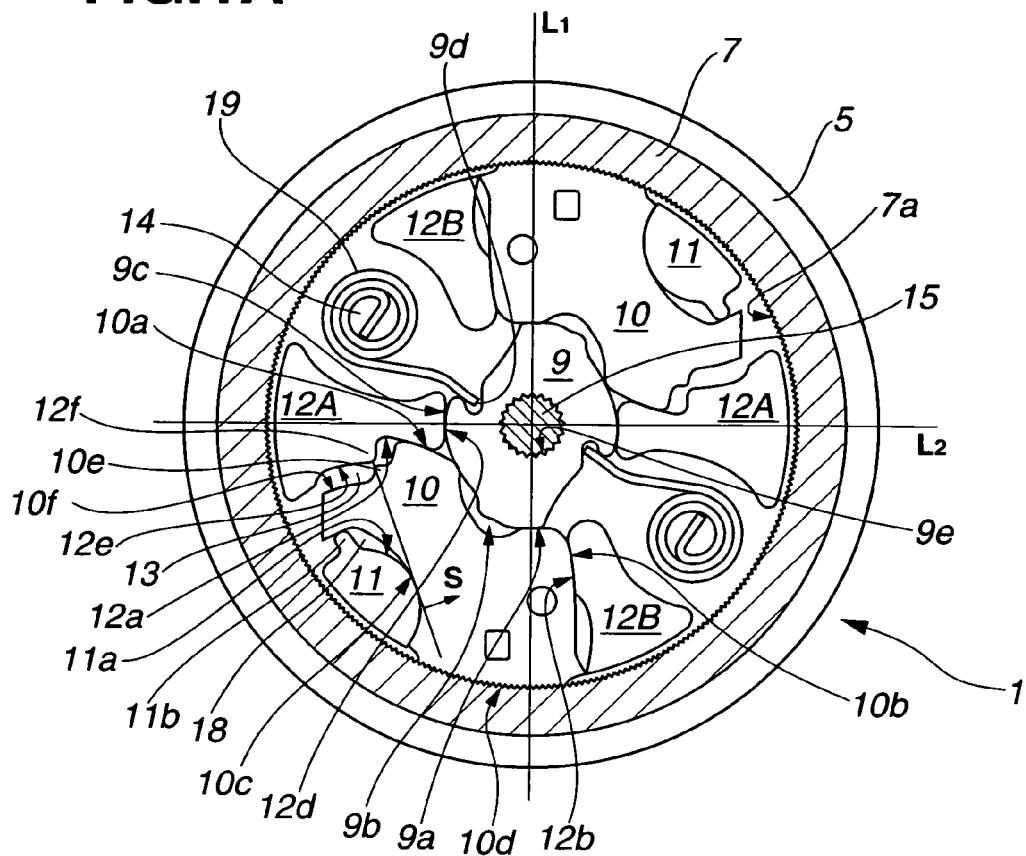
FIG. 1A is an axial elevation, partly in section, of an embodiment of a seat reclining apparatus for a vehicle, according to the present invention.

Referring now to the accompanying drawings, an embodiment of a seat reclining apparatus for a vehicle, according to the present invention is illustrated by reference numeral 1.

Figure 6:
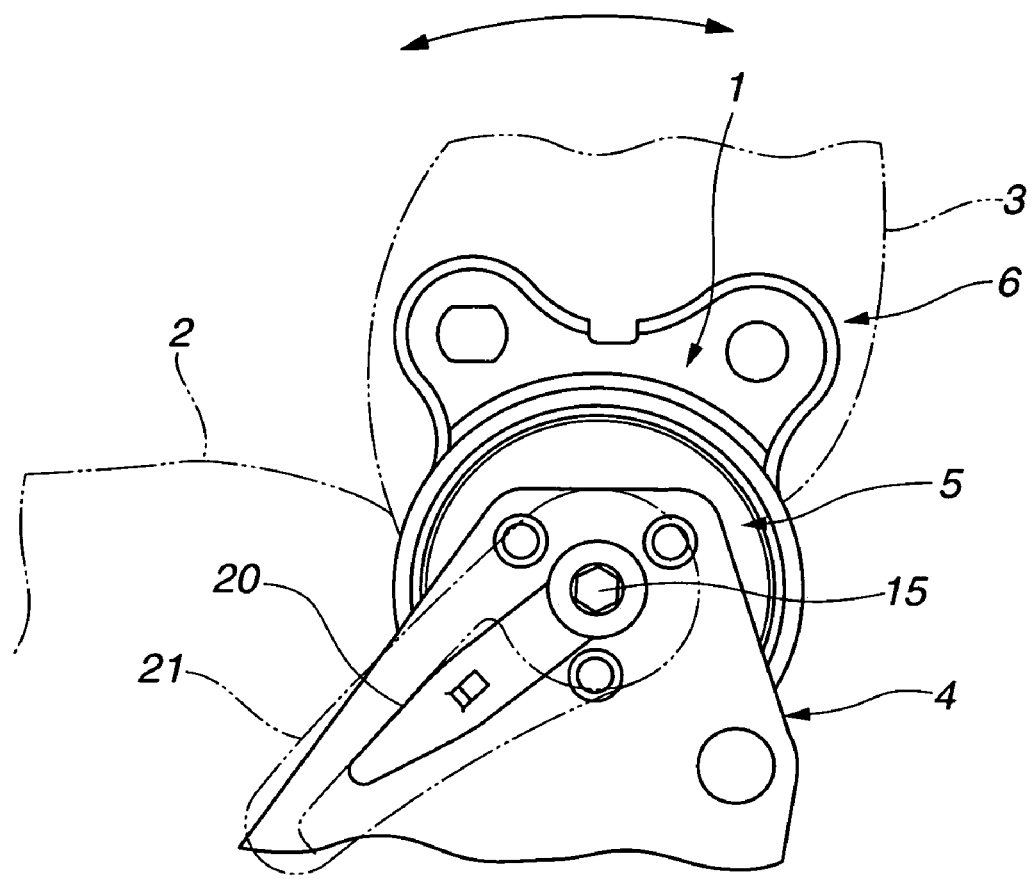
FIG. 6 is a fragmentary side view of a vehicle seat to which the seat reclining apparatus according to the present invention is installed.

As shown in FIG. 6, a vehicle seat (non numeral) includes a seat cushion 2 on which a vehicle occupant is to be seated. A seat back 3 is fixed rotatable relative to the seat cushion 2 in such a manner as to rotationally incline in a fore-and-aft direction of a vehicle. A frame or base member 5 is connected to the seat cushion 2 through a base plate 4. A lid member or rotational member 7 which is not illustrated is connected to the seat back 3 through an arm plate 6. Additionally, a spring is disposed to bias the seat back 3 in a direction to fall leftward in FIG. 6, though not shown. The left side in FIG. 6 corresponds to the front side of the vehicle.

Figure 1B:
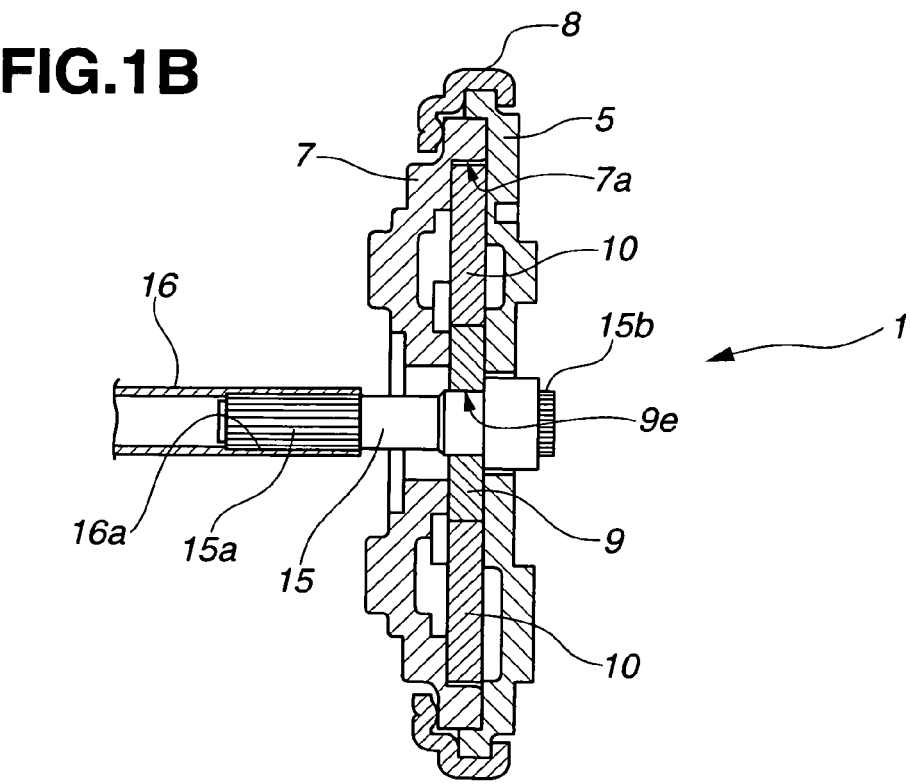
FIG. 1B is a side sectional view of the seat reclining apparatus of FIG. 1A.

As illustrated in FIGS. 1A and 1B, the seat reclining apparatus 1 for the vehicle will be discussed in detail. The above frame 5 and the above lid member 7 constitute the seat reclining apparatus 1. The frame 5 is formed with a circular depression and produced in such a manner that one side of a circular disc is shallowly hollowed by pressing. The lid member 7 is similarly formed with a circular depression and produced in such a manner that one side of a circular disc is shallowly hollowed by pressing. An internal gear 7a is formed at an inner peripheral surface defining the circular depression. The lid member 7 is fitted into the circular depression of the frame 5 in such a manner as to be coaxial with and rotatable to the frame 5. Additionally, a ring-shaped holder 8 is fitted around the outer peripheral sections of the lid member 7 and the frame as shown in FIG. 1B, thereby holding them rotatable to each other without separation of them from each other in the axial direction. A rotary cam 9 is disposed at the central position of a space defined between the frame 5 and the lid member 7 in the axial direction. In the space, a pair of lock tooths 10 is disposed swingably at vertically opposite sides of the cam 9.

On the inner peripheral side of an arcuate orbit along which the lock tooth 10 is swingably guided, a cylindrical shaft section 11 is formed. The cylindrical shaft section 11 having an inner peripheral side guide surface 11a is formed integral with the frame 5. A bearing surface 10c is formed by generally circularly (in cross-section) cutting out a part of the lock tooth 10. In the vicinity of the both ends of the outer peripheral side of the arcuate orbit along which the lock tooth 10 is swingably guided, first and second guide projections 12A and 12B are formed integral with the frame 5 in order to guide the lock tooth 10. The first and second guide projections 12A and 12B have first and second outer peripheral side guide surfaces 12a and 12b, respectively. Additionally, the lock tooth 10 is formed with first and second outer peripheral side slide surfaces 10a and 10b which are respectively slidably contacted with the first and second outer peripheral side guide surfaces 12a and 12b. The lock tooth 10 swings along the arcuate orbit, so that each of the first and second outer peripheral side slide surfaces 10a and 10b and the first and second outer peripheral side guide surfaces 12a and 12b is formed arcuate and coaxial with the axis of the shaft section 11. Further, the lock tooth 10 which swings along the arcuate orbit has an external gear 10d at its surface facing the internal gear 7a which gear is engageable with the internal gear 7a.

The cam 9 is disposed in order to bias the lock tooth 10 formed with the external gear 10d engageable with and disengageable from the internal gear 7a toward the internal gear 7a. When the cam 9 is rotated about a center hole 9e counterclockwise, each of the pair of the lock tooths 10 is biased radially outwardly from the cam 9 thereby engaging the external gear 10d with the internal gear 7a. When the cam 9 is rotated clockwise, the external gear 10d is disengaged from the internal gear 7a. In a state where the external gear 10d is engaged with the internal gear 7a, rotation of the lid member 7 relative to the frame 5 is restricted, so that the seat back 3 is kept at a certain angular position with respect to the seat cushion 2.

The cam 9 has a lock cam face 9a which swings the lock tooth 10 clockwise thereby engaging the external gear 10d with the internal gear 7a, and a lock-release cam face 9b which swings the lock tooth 10 counterclockwise thereby disengaging the external gear 10d from the internal gear 7a. The cam 9 has a slide outer peripheral face 9c through which an imaginary plane $L_2$ passes in order to restrict movement of the cam 9 in the direction of the line $L_2$. The line $L_2$ generally perpendicular to another imaginary plane $L_1$ connecting opposite cam faces 9a which are respectively located at upper and lower sides in FIG. 1A. The slide outer peripheral face 9c is formed arcuate (in section) of a circle whose center corresponds to the axis of the cam 9 or the axis of an operation shaft 15. The slide outer peripheral face 9c is always in slidable contact with a slidably contacting surface 12d formed in the first guide projection 12A.

Further, a lock spring 19 is disposed to bias the cam 9 to rotate counterclockwise in order that the external gear 10d of the lock tooth 10 is biased under the biasing force to be always in engagement with the internal gear 7a. The lock spring 19 is installed in such a manner that a base end portion of the lock spring 19 is fixed to a generally semi-cylindrical projection 14 formed integral with the frame 5, and that a tip end portion of the lock spring 19 is engaged with an engagement section 9d formed on the outer peripheral surface of the cam 9.

When a load is applied to the seat back 3 in a direction to fall forward in FIG. 6, a relative rotational force of the lid member 7 to the frame 5 is transmitted to the lock tooth 10 through a meshing section where the external gear 10d is engaged with the internal gear 7a. With this, the lock tooth 10 intends to rotate clockwise in FIG. 1, however, the lock tooth 10 is supported by the cam 9, the shaft section 11 and the first guide projection 12A so as to be prevented from its clockwise rotation. The lock tooth 10 is formed with an arcuate contact face 10f formed coaxial with the shaft section 11. The contact face 10f is located opposite to the external gear 10d with respect to the shaft section 11. Meanwhile, the first guide projection 12A (one of guide projections) has a backup surface 12e for supporting the contact face 10f through a clearance 13. When a load applied to the lock tooth 10 is received by the shaft section 11 and the first outer peripheral side guide surface 12a and when this load increases to promote deformation of the lock tooth 10, the contact face 10f is brought into contact with and supported by the backup surface 12e. Each of the contact face 10f and the backup surface 12e is formed arcuate and coaxial with the inner peripheral side guide surface 11a of the shaft section 11.

Figure 2:
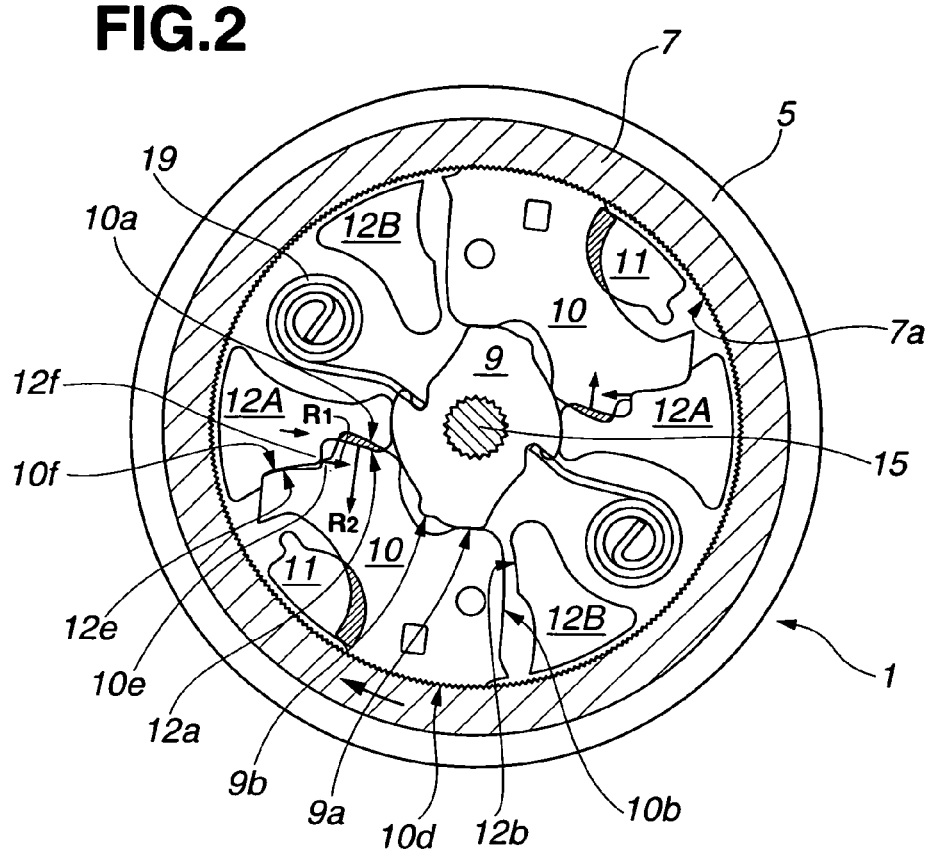
FIG. 2 is an explanatory view illustrating operation of the seat reclining apparatus of FIG. 1A, in a case where a high load is applied to a seat back in a direction to fall forward.

The lock tooth 10 has a protruding section 10e which is formed to be brought into contact with a step portion 12f formed between the first outer peripheral side guide surface 12a and the backup surface 12e before the contact face 10f is brought into contact with the backup surface 12e. As shown in FIG. 2, a reactive force $R_1$ which the protruding section 10e receives from the step portion 12f when the protruding section 10e is brought into contact with the step portion 12f is set to be directed onto the side of the cam 9 with respect to a tangential plane S including a tangent line of the bearing surface 10c (in section) of the lock tooth 10 in slidable contact with the inner peripheral side guide surface 11a as shown in FIG. 1A, the tangential plane passing through the step portion 12f In other words, the tangential plane extends from the step portion 12f to the bearing surface 10c of the lock tooth 10. Thus, the reactive force $R_1$ is directed rightward with respect to the tangential plane S, as illustrated in FIG. 2.

The seat reclining apparatus 1 for the vehicle is disposed on widthwise opposite sides of the seat cushion 2. That is, the seat cushion 2 is equipped with right-side and left-side seat reclining apparatuses 1. As shown in FIG. 1B, each of the right-side and left-side seat reclining apparatuses 1 for the vehicle has the operation shaft 15, in which the operation shafts 15 of the right-side and left-side seat reclining apparatuses 1 are connected to each other through a cylindrical shaft 16. More specifically, the operation shaft 15 is fixedly press-fitted in the center hole 9e of the cam 9 and has a serration (or joint portion) 15a at its one end section. The operation shaft 15 is connected to the shaft 16 through the serration 15a and a serration 16a formed inside the cylindrical shaft 16.

Another serration 15b formed at the other end section of the operation shaft 15 projects outwardly over the base plate 4, as shown in FIG. 1B, and an operation lever 20 is fixed thereto. Additionally, an operation knob 21 is mounted on the operation lever 20, as shown in FIG. 6.

Operation of the seat reclining apparatus 1 for the vehicle will be discussed.

In a state where the seat reclining apparatus 1 for the vehicle is assembled to the vehicle seat, the cam 9 is normally rotated counterclockwise under the biasing force of the lock spring 19, as shown in FIG. 1A. At this time, the lock tooth 10 is biased by the lock cam face 9a so as to swing clockwise through the shaft section 11 and the first and second outer peripheral side guide surfaces 12a and 12b, thereby establishing a locking state in which the external gear 10d is engaged with the internal gear 7a of the lid member 7, so i.e., a condition in which rotation of the seat back 3 is restricted.

When the operation knob 21 is operated to rotate the operation shaft 15 clockwise in FIG. 6 against the biasing force of the lock spring 19, the lock tooth 10 is biased by the lock-release cam face 9b in an opposite direction while the lock cam face 9a of the cam 9 is disengaged from the lock tooth 10. Hence, the lock tooth 10 swings counterclockwise about the shaft section 11 so as to disengage the external gear 10d from the internal gear 7a, thereby establishing a lock released state. When the locking state is thus released, the arm plate 6 and the seat back 3 to which the lid member 7 is fixed are rotationally moved in such a direction that the seat back 3 falls forward under the biasing force of the spring not illustrated.

Now, the operation knob 21 is operated by hand to allow the seat back 3 rotationally incline rearward against the biasing force of the spring not illustrated, and then released from the hand when the seat back 3 reaches a desired angle position. Upon this, the cam 9 is rotated counterclockwise under the biasing force of the lock spring 19, so that the lock cam face 9a biases the lock tooth 10 clockwise. Therefore, the external gear 10d is brought into engagement with the internal gear 7a thereby establishing the locking state again.

Operation in a case in which a load is applied to the seat back 3 shown in FIG. 6 in a direction to fall forward will be discussed with reference to FIG. 2. In this case, the lid member 7 tends to rotate relative to the frame 5 clockwise as indicated by an arrow, so that the rotational force is transmitted to the lock tooth 10 through the meshing section where the external gear 10d is engaged with the internal gear 7a. With this, the lock tooth 10 tends to rotate clockwise in FIG. 2 so as to be supported by the cam 9, the shaft section 11 and the first outer peripheral side guide surface 12a. When the load applied to the seat back 3 increases, deformation is made at portions where the lock tooth 10 is brought into contact with the shaft section 11 and the first outer peripheral side guide surface 12a as shown in FIG. 2. The protruding section 10e of the lock tooth 10 is brought into contact with the step portion 12f before the contact face 10f is brought into contact with the backup surface 12e so as to lose the clearance 13. At this time, the protruding section 10e receives the reactive force $R_1$ from the step portion 12f The reactive force $R_1$ is directed onto the side of the cam 9 with respect to the tangential plane S, so that the lock tooth 10 never receives a bending stress for causing the lock tooth 10 to bend counterclockwise. It is thus avoided that the lock tooth 10 is broken before the contact face 10f is brought into contact with the backup surface 12e. Another reactive force $R_2$ which the lock tooth 10 receives from the first outer peripheral side guide surface 12a is directed to the shaft section 11 against the moving direction of the lock tooth 10. Therefore, it will be understood that a bending stress by the reactive force $R_2$ is small.

Figure 3:
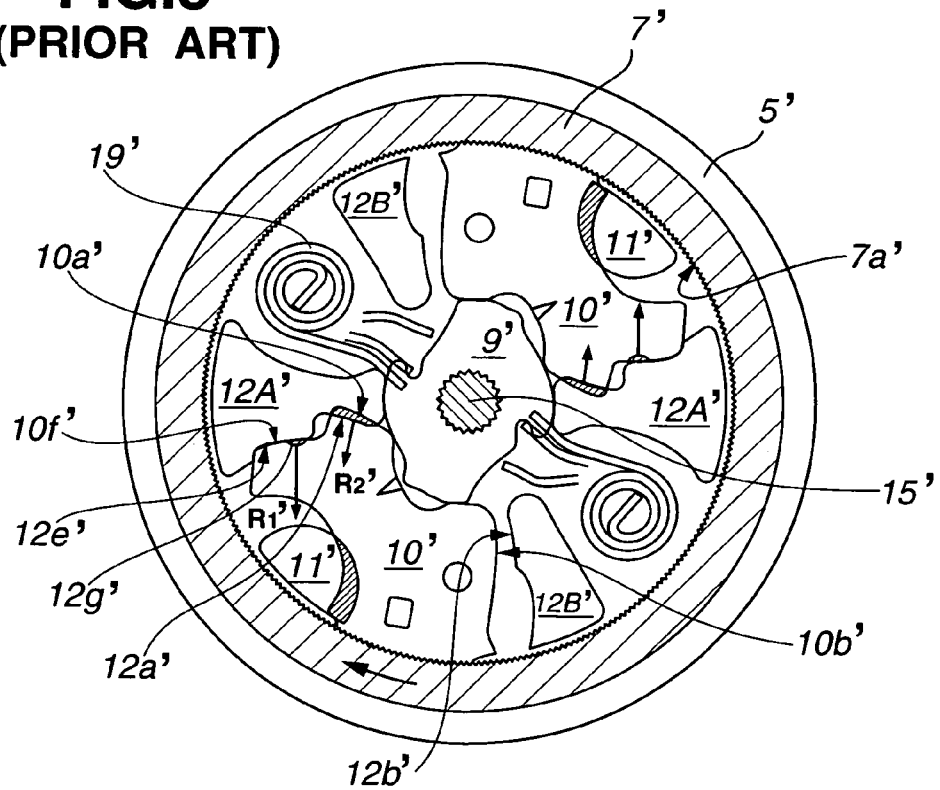
FIG. 3 is an explanatory view illustrating operation of a conventional seat reclining apparatus, in a case where a high load is applied to a seat back in a direction to fall forward.

For the comparison purpose, FIG. 3 illustrates a conventional seat reclining apparatus for vehicle in comparison with that in FIG. 2, in which a load is applied to its seat back in a direction to fall forward, same as the case in FIG. 2. In the conventional seat reclining apparatus, a protruding portion 12g' is formed at a part of a backup surface 12e'. With this, a reactive force $R_1$' which a lock tooth 10' receives from the protruding portion 12g' is directed to the central part of a shaft section 11', i.e., directed onto the side of the shaft section 11' with respect to a tangential plane of a bearing surface 10c' which plane extends to the protruding portion 12g' of the backup surface 12e'. Accordingly, the lock tooth 10' receives an excessive bending stress before being brought into contact with the backup surface 12e', thereby being broken in the vicinity of the bearing surface 10c'. In FIG. 3, the reference numerals and characters similar to those in FIG. 2 designate similar parts and elements those in FIG. 2.

Figure 4:
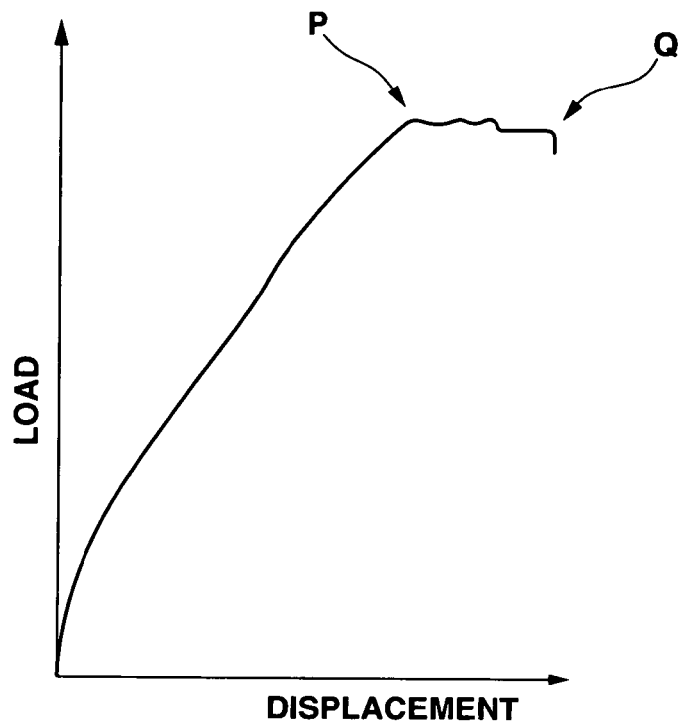
FIG. 4 is a graph showing a relationship between a load and displacement of a lock tooth, in a case where a high load is applied to the seat back connected to the seat reclining apparatus of FIG. 2 in a direction to fall forward.
Figure 5:
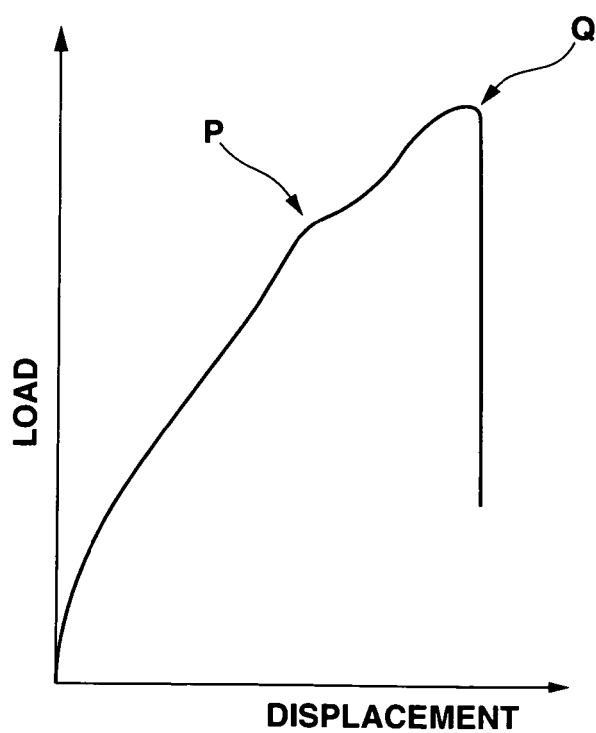
FIG. 5 is a graph showing a relationship between a load and displacement of the lock tooth, in a case where a high load is applied to the seat back connected to the conventional seat reclining apparatus of FIG. 3 in a direction to fall forward.

FIGS. 4 and 5 show a relationship between a load applied to the seat back 3 to fall forward and a breaking strength. Specifically, FIG. 4 shows a case of the seat reclining apparatus 1 according to the present invention as shown in FIG. 2, and FIG. 5 shows a case of the conventional seat reclining apparatus as shown in FIG. 3. A position P indicates crack formation occurred in the lock tooth 10. A position Q indicates chipping occurred in the internal gear 7a or external gear 10d.

As shown in FIG. 5, the crack formation or breakage occurs in the progress of displacement. With the protruding portion 12g' formed on the backup surface 12e, a load which the first guide projection 12A receives is increased. However, a bending stress applied to the lock tooth 10 is large as compared with the load, so that breakage occurs at an early stage in displacement. In a state where the lock tooth 10 has been broken, engagement between the external gear 10d and the internal gear 7a is gradually degraded. Additionally, as can be seen from FIG. 5, a load applied to the seat back 3 still increases even after the lock tooth 10 has been broken, in which the engagement between the external gear 10d and the internal gear 7a is degraded so as to make chipping of the external gear 10d. This increases dispersion in load and unstable in strength.

In contrast, in FIG. 4 according to the present invention, the lock tooth 10 is broken at the maximum load. This will be explained hereinafter. By bringing the protruding section 10e into contact with the step portion 12f, a load which the first guide projection 12A receives is increased; however, a bending stress applied to the lock tooth 10 is small. As a result, breakage of the lock tooth 10 does not occur until the contact face 10f is brought into contact with the backup surface 12e of the first guide projection 12A. Therefore, displacement of the lock tooth 10 progresses keeping the engagement between the external gear 10d and the internal gear 7a. Then, the lock tooth 10 is to be broken only upon being forced to be further displaced in a state where the contact face 10f of the lock tooth 10 is in contact with the backup surface 12e of the first guide projection 12A. However, the load has already reached the maximum level at this time, so that the load never largely disperses even after the engagement is so degraded as to make chipping of the teeth. Hence, the seat reclining apparatus for the vehicle according to the present invention can be improved and stabilized in strength, because it is made possible to keep the engagement between the external gear 10d and the internal gear 7a while increasing a load applied to the first guide projection 12A.

Although the invention has been described above by reference to certain embodiments and examples of the invention, the invention is not limited to the embodiments and examples described above. Modifications and variations of the embodiments and examples described above will occur to those skilled in the art, in light of the above teachings. For example, although the seat reclining apparatus in the embodiment discussed above is so arranged that the lid member 7 is rotated relative to the frame 5 clockwise when a load is applied to the seat back 3 in a direction to fall forward, it will be understood that the seat reclining apparatus may be so arranged that the lid member 7 is rotated relative to the frame 5 clockwise when a load is applied to the seat back 3 in a direction to fall rearward.

As apparent from the above, in the seat reclining apparatus for the vehicle, according to the present invention, one of guide sections is provided with a step portion between an outer peripheral side guide surface and a backup surface while a lock tooth is provided with a protruding section which is to be brought into contact with the step portion. Additionally, an arrangement is made such that a reactive force which the protruding section receives from the step portion when the protruding section is brought into contact with the step portion is set to be directed onto the side of a cam with respect to a tangential plane to a bearing surface of the lock tooth, the tangential plane passing the step portion. With this, a load can be received also by the step portion and the protruding section, while a bending stress by which the lock tooth tends to be bent at a portion in the vicinity of the bearing surface decreases, thereby preventing the lock tooth from its breakage. Therefore, the seat reclining apparatus can be improved and stabilized in strength.

The entire contents of Japanese Patent Application P2005-064746 (filed Mar. 9, 2005) are incorporated herein by reference.

What is claimed is:

1. A seat reclining apparatus for a vehicle, comprising:
a base member connected to one of a seat cushion and a seat back rotatably fixed to the seat cushion;
a rotational member having an internal gear formed at an inner peripheral surface of the rotational member, the rotational member being connected to other of the seat cushion and the seat back and rotatable relative to the base member in a peripheral direction of the rotational member;
a lock tooth having an external gear which is engageable with the internal gear, the lock tooth being swingable in directions in which the external gear is engaged with and disengaged from the internal gear;
a shaft section having an inner peripheral side guide surface for swinging the lock tooth along an arcuate orbit, the shaft section being formed integral with the base member;
a pair of guide sections each of which has an outer peripheral side guide surface for swinging the lock tooth along the arcuate orbit and is formed integral with the base member and located in vicinity of opposite ends of the arcuate orbit; and
a cam for biasing the lock tooth to engage the external gear with the internal gear,
wherein the lock tooth has an outer peripheral side slide surface formed facing one of the guide sections on a side of the shaft section with respect to the external gear and slidably contacted with the outer peripheral side guide surface of the one of the guide sections; the one of the guide sections has a backup surface for receiving a load from the lock tooth when the load is high; the lock tooth has a contact face facing the backup surface through a clearance, so that a rotational load for rotating the rotational member relative to the base member is received by the shaft section and the one of the guide sections when the rotational load acts, wherein the one of the guide sections has a step portion formed between the outer peripheral side guide surface and the backup surface; the lock tooth includes a protruding section which faces the step portion and is located between the outer peripheral side slide surface and the contact face, so that a reactive force which the protruding section receives from the step portion when the protruding section is brought into contact with the step portion is directed a onto side of the cam with respect to a tangential plane to a bearing surface of the lock tooth, the tangential plane passing the step portion, the bearing surface being slidably contacted with the inner peripheral side guide surface of the shaft section.

2. A seat reclining apparatus as claimed in claim 1, wherein the tangential plane contains a tangent line to the bearing surface of the lock tooth on a plane perpendicular to axis of the cam, the tangent line passing through the step portion on the plane.

3. A seat reclining apparatus as claimed in claim 2, wherein the lock tooth is divided into first and second sections by the tangential plane, the first section being located facing to and contactable with the cam, the second section being located facing and contactable with the shaft section, wherein the reactive force is directed to the first section of the lock tooth.

* * * * *